United States Patent [19]

Teague, Jr.

[11] Patent Number: 4,497,362

[45] Date of Patent: Feb. 5, 1985

[54] REGENERATIVE ROOM AIR EXCHANGER

[75] Inventor: W. Dorwin Teague, Jr., Nyack, N.Y.

[73] Assignee: Southern California Gas Co., Los Angeles, Calif.

[21] Appl. No.: 477,021

[22] Filed: Mar. 21, 1983

[51] Int. Cl.³ .......................... F24F 7/08; F24D 15/00
[52] U.S. Cl. ................................ 165/54; 165/DIG. 12
[58] Field of Search .......................... 165/DIG. 12, 54

[56] References Cited

U.S. PATENT DOCUMENTS

| 2,303,157 | 11/1942 | Bush ................. | 165/DIG. 12 X |
| 3,417,577 | 12/1968 | Waldron ............. | 165/DIG. 12 X |
| 4,149,590 | 4/1979  | Ospelt .............. | 165/DIG. 12 X |
| 4,377,201 | 3/1983  | Kruse et al. ........ | 165/DIG. 12 X |

FOREIGN PATENT DOCUMENTS 1089034 3/1955 France .................. 165/DIG. 12

Primary Examiner—William R. Cline
Assistant Examiner—Edward P. Walker
Attorney, Agent, or Firm—Pasquale A. Razzano

[57] ABSTRACT

A regenerative room air exchanger for use in a house has a first vertically disposed conduit through which room air flows to be exhausted, the first conduit including a first set of vertically disposed channels, a second vertically disposed conduit through which fresh air flows to the room, the second conduit including a second set of vertically disposed channels with the first and second sets of channels being interdigitated and in counterflow heat exchange relationship with each other, and a jacket surrounding and spaced from the interdigitated channels to form a third vertically disposed conduit between the jacket and the channels, the third conduit being in fluid communication with the first conduit. An exhaust blower is in fluid communication with the first conduit and an inlet blower is in fluid communication with the second conduit. A removal register is coupled to the third conduit and is positioned in the room in the vicinity of the ceiling to permit room air to pass therethrough to the third conduit and then through the first conduit to the exhaust blower. A supply register is coupled to the second conduit and is positioned in the room in the vicinity of the floor to permit fresh air which is supplied from the inlet blower and the second conduit to pass therethrough into the room.

16 Claims, 6 Drawing Figures

FIG. 2
FIG. 6
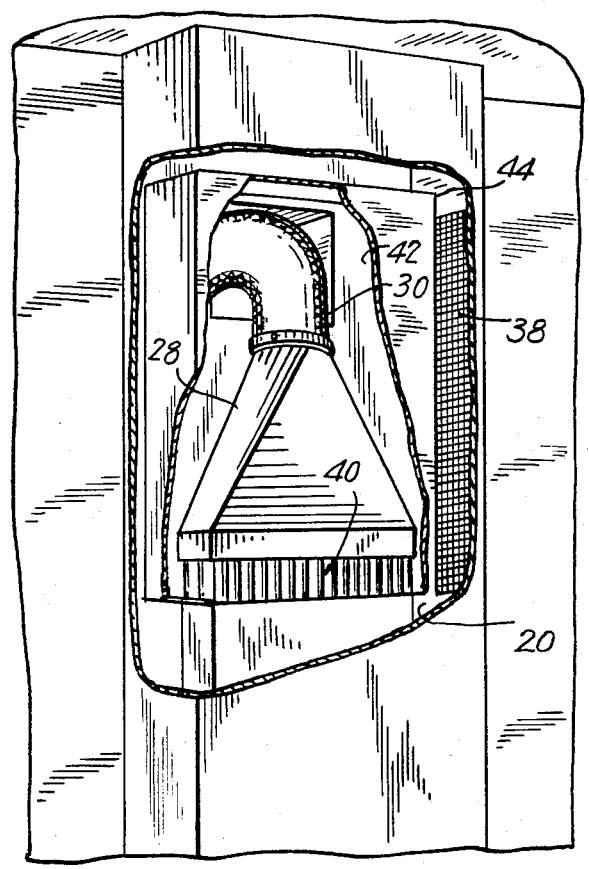
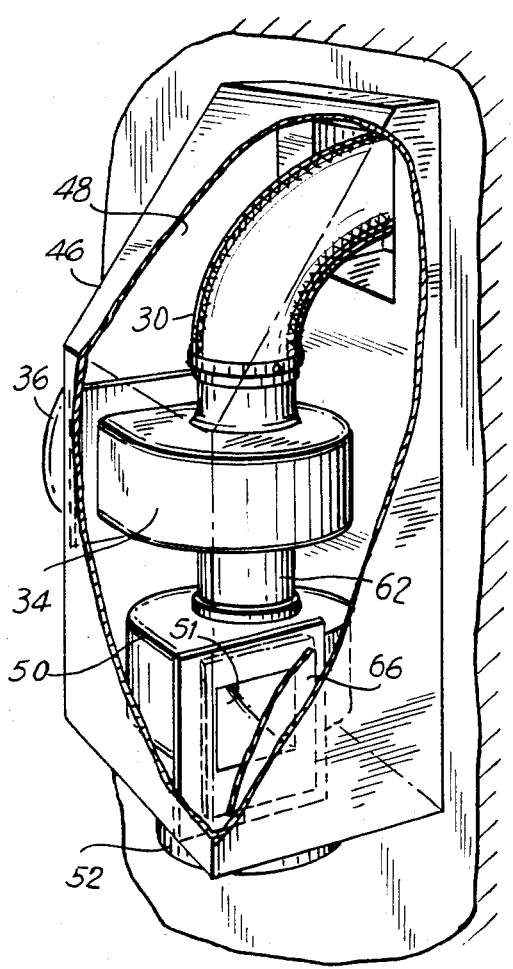
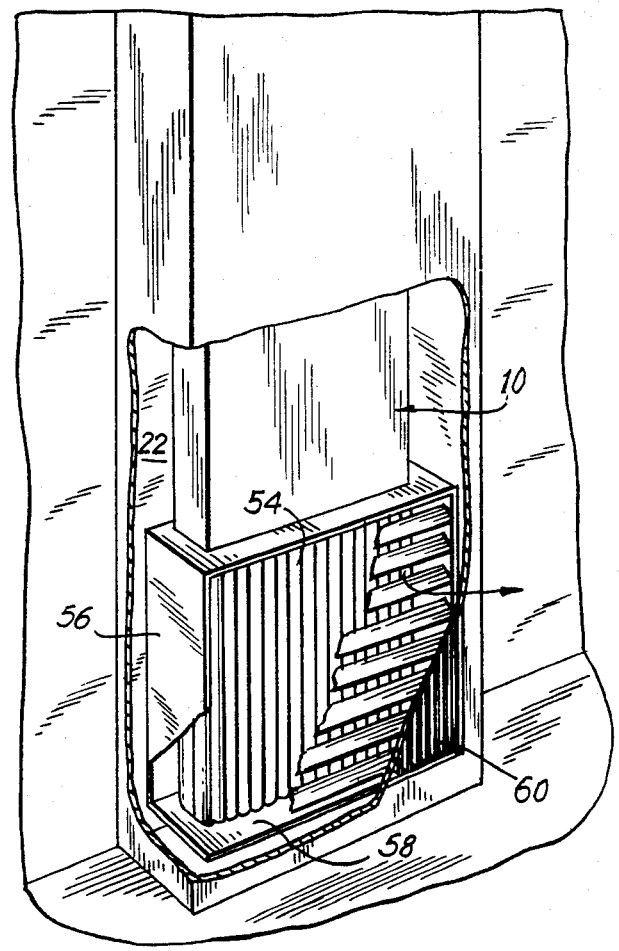

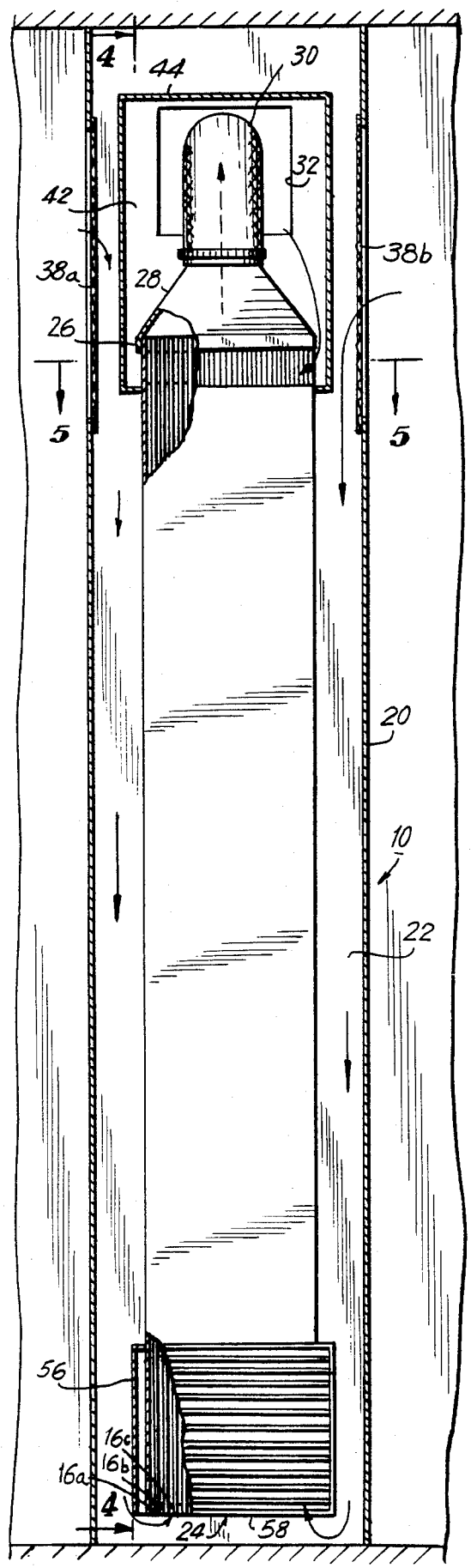
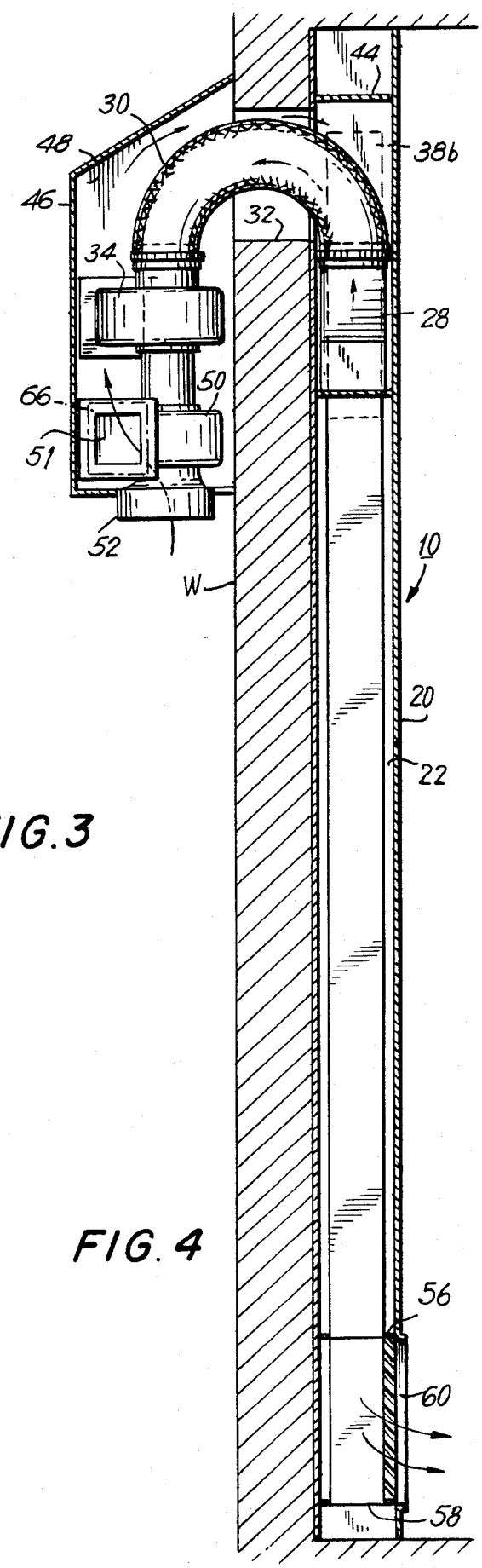
FIG. 3
FIG. 4

REGENERATIVE ROOM AIR EXCHANGER

BACKGROUND OF THE INVENTION

This invention relates to a room ventilator and, more particularly, to a regenerative room ventilator of the type wherein polluted air is removed from and fresh air is supplied to the room, and wherein heat is transferred between the polluted, or room, air and the fresh air.

In an effort to conserve energy, buildings, and particularly dwellings, are constructed in a manner which minimizes leakage between air within the structure and exterior air. Sources of leakage, such as joints, windows, doors and other openings, typically are sealed effectively to prevent any leakage of warm interior air during the cold winter season or cool, air-conditioned interior air during the summer season. While such sealing techniques have improved energy conservation, the resultant reduction of air infiltration has aggravated indoor pollution.

Polluted, or stale, room air generally is not replaced with fresh air in sealed houses unless a door or window is opened or other effective ventilating equipment is provided. In its simplest form, a room ventilator may be constructed merely as a register or duct in an outside wall or roof of a house to permit polluted room air to pass therethrough to the exterior and to allow fresh air to enter the house. Such a simple ventilator is, however, a source of energy loss by allowing warm air to escape during the winter and by allowing cool air to escape during the summer.

More complicated air exchangers have been proposed wherein exhaust and inlet conduits are disposed in heat exchange relationship to permit the heat from exhausted room air to be transferred to incoming fresh air. Such exchangers reduce energy loss by replacing polluted room air with fresh air. However, one difficulty encountered with such exchangers is the installation thereof. Generally, these devices are installed by suspending them beneath the floor or elevating them above a ceiling in a house. If the house is a completed structure, such installation is time-consuming and expensive because substantial renovations in the building itself may be needed. Also, the respective flows of polluted and fresh air in such exchangers typically are in the horizontal direction, thus requiring relatively large horizontal structures to effect proper heat exchange between these air flows. Moreover, because the polluted and fresh air flow in horizontal channels, the polluted air inlet and fresh air outlet to a room are constrained to be closely spaced to each other. This results in feedback or "cross-talk" by which the fresh air is fed back into the polluted air discharge channel. Consequently, the efficiency of such exchangers in removing pollution and in warming the incoming fresh air is reduced. One type of exchanger is adapted to be installed in a partially-opened window of the house. While this installation is relatively simple, it suffers from the disadvantages of obscuring a substantial portion of the window area, it is aesthetically displeasing, it exhibits the aforementioned cross-talk, and it is relatively noisy in operation.

Although vertically oriented heat exchangers have been known, such as described in U.S. Pat. Nos. 1,871,322, 1,960,325, 2,091,119, 2,360,094 and 2,488,333, as examples, such heat exchange apparatus generally is not used as a room ventilator by which polluted, stale room air is replaced by fresh air.

OBJECTS OF THE INVENTION

Therefore, it is an object of the present invention to provide an improved, relatively simple, easily installed room ventilator.

Another object of this invention is to provide a simple, efficient room ventilator which functions to remove polluted air from the vicinity of the ceiling of a room and to supply fresh air to that room in the vicinity of its floor.

A further object of this invention is to provide a room ventilator wherein vertically disposed exhaust air and fresh air conduits are adjacent one another for counterflow heat exchange, whereby incoming fresh air is heated efficiently from outgoing polluted air.

An additional object of this invention is to provide a room ventilator of the aforementioned type wherein inlet and exhaust blowers are located at the exterior of the building structure so as to minimize noise from within while exhausting polluted air to the exterior of the building and drawing fresh air in from the outside.

Yet another object of this invention is to provide a room ventilator of the aforementioned type wherein the exhaust air and fresh air conduits are formed of respective sets of interdigitated channels which are surrounded by yet another conduit, whereby each fresh air channel is substantially surrounded by polluted air flow, thereby improving the heat exchange efficiency of the ventilator.

Various other objects, advantages and features of the present invention will become readily apparent from the ensuing detailed description, and the novel features will be particularly pointed out in the appended claims.

SUMMARY OF THE INVENTION

In accordance with this invention, room air ventilator apparatus for use in a house is provided with a first vertically disposed conduit through which polluted room air flows to the exterior of the house, the first conduit including a first set of vertically disposed channels, a second conduit through which fresh air flows to the room, the second conduit including a set of vertically disposed channels interdigitated with the aforementioned first set, and a jacket surrounding and spaced from the interdigitated channels so as to form a third vertically disposed conduit in the space between the jacket and the channels. Polluted air flows through the first set of channels in counterflow relationship with the fresh air which flows through the second set of channels. The third conduit is in fluid communication with the first conduit; and a removal register is coupled to the third conduit in the vicinity of the ceiling of the room so as to permit polluted air to pass through the removal register to the third conduit and then into the first conduit to be exhausted from the house. An exhaust blower is in fluid communication with the first conduit to discharge the polluted room air. An inlet blower is in fluid communication with the second conduit to supply fresh air thereto; and a supply register is coupled to the second conduit in the vicinity of the floor of the room to supply to the room fresh air which flows through the second conduit.

In accordance with one embodiment of the present invention, the exhaust and inlet blowers are driven by a common drive motor. In accordance with another embodiment, these blowers are driven by respective motors which may be singly and individually turned off. The latter embodiment provides further energy conservation when, for example, the temperature of the room air is relatively high, whereupon the exhaust blower remains idle and the ventilator serves to draw in fresh air which will be heated only minimally in the heat exchanger included in the ventilator.

In one advantageous aspect of the invention, the exhaust and inlet blowers are located at the exterior of the house. This serves to minimize noise perceived from the interior.

BRIEF DESCRIPTION OF THE DRAWINGS

The following detailed description, given by way of example, will best be understood in conjunction with the accompanying drawings in which:

FIG. 2 is a perspective view, partially broken away, of a portion of the ventilator apparatus in accordance with this invention;

FIG. 3 is a sectional front view of the ventilator apparatus;

FIG. 4 is a sectional view taken along lines 4—4 in FIG. 3;

FIG. 6 is a perspective view of the exhaust and inlet blowers which are used with the ventilator apparatus of the present invention.

DETAILED DESCRIPTION OF A CERTAIN PREFERRED EMBODIMENT

The present invention finds ready application as a room ventilator for the kitchen of a typical dwelling. Polluted air caused by several contaminants, such as CO, NO, $NO_2$, $SO_2$, ozone and radon, commonly found in kitchens is replaced by fresh air. The present invention also may be used as a ventilator for other rooms in the house, such as the bathroom, furnace room, and the like.

Figure 1:
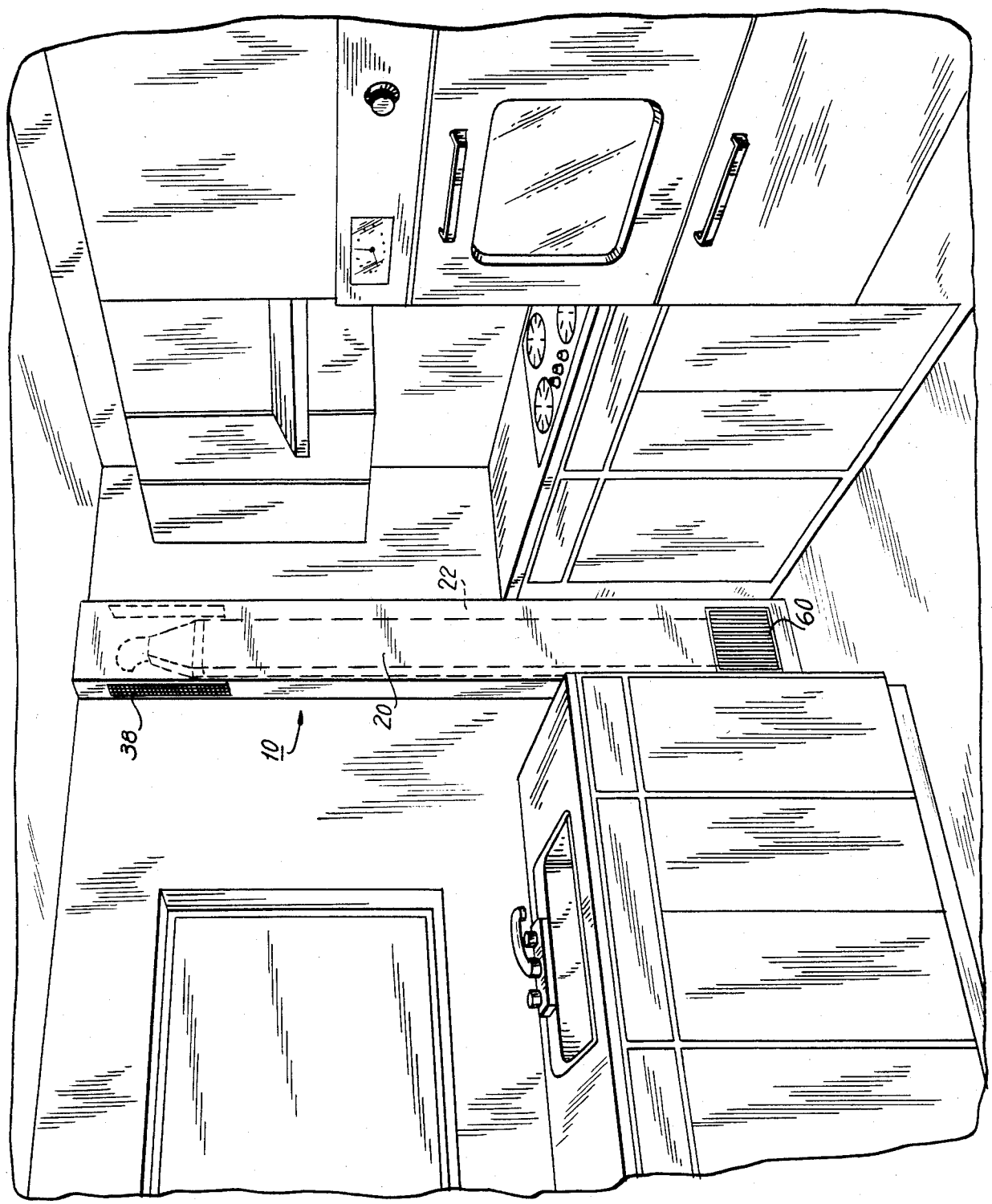
FIG. 1 is a perspective view of a typical room in which the present invention finds ready application.

Referring now to the drawings, wherein like reference numerals are used throughout, FIG. 1 is a perspective view of a kitchen in which room ventilator 10 of the present invention is installed. As best shown in FIGS. 1-4, this room ventilator is constructed to provide longitudinal channels through which polluted air flows from the kitchen to the exterior of the house and interdigitated longitudinal channels through which fresh air flows from the exterior of the house to the kitchen. It will be appreciated that the respective air flows are linear, that is, they flow in a substantially straight line, as opposed to being rotary. It will also be understood that the polluted air and the fresh air exhibit a counterflow relationship, that is, they flow in opposite longitudinal directions. This facilitates heat exchange therebetween.

As best shown in FIG. 1, a removal register 38 is located in the vicinity of the ceiling of the kitchen to permit polluted air to pass therethrough into room ventilator 10, this polluted air first flowing downward within the ventilator from removal register 38 and then upward through an exhaust air conduit to be discharged from the house. FIG. 1 also illustrates a supply register 60 located in the vicinity of the floor of the kitchen. This supply register permits fresh air which is brought into ventilator 10 from outside the house to pass into the kitchen. Since removal and supply registers 38 and 60 are separated by the length of ventilator 10, which may be on the order of about 6 to 7 feet, there is little possibility of any feedback or cross-talk between the polluted air which is removed from the room and the fresh air which is supplied to it. That is, the fresh air does not mix readily with the polluted air to be discharged quickly from the room by way of removal register 38.

It will be appreciated that, since the removal register is located in the vicinity of the ceiling, warm polluted air containing the aforementioned contaminants is readily removed from the kitchen. That is, the removal register is disposed at the very location at which pollutants are more concentrated.

Figure 5:
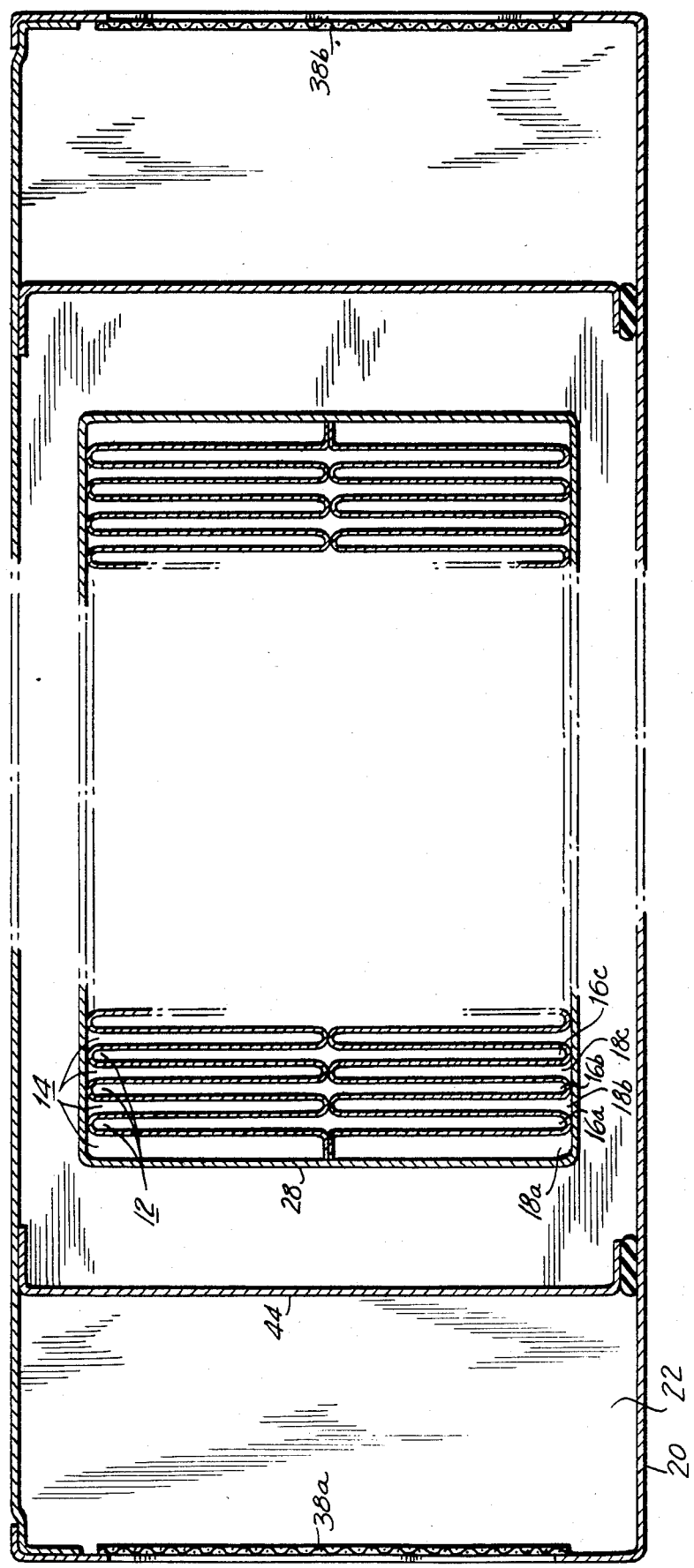
FIG. 5 is a sectional view taken along lines 5—5 of FIG. 3.

Turning now to FIGS. 2-5, it is seen that room ventilator 10 is comprised of a vertically disposed exhaust air conduit 12 formed of a first set of vertically disposed channels 16, and a vertically disposed fresh air conduit 14 formed of a second set of vertically disposed channels 18. Channels 16 and 18 are interdigitated such that, as best shown in FIG. 5, these channels alternate with one another. The exhaust air channels are isolated from the fresh air channels, and each set of channels is formed of longitudinal ducts. Thus, when viewed from left-to-right in FIG. 5, a fresh air channel, or duct 18a is adjacent an exhaust air channel, or duct 16a, which is next followed by a fresh air channel 18b and then an exhaust air channel 16b and then a fresh air channel 18c and then an exhaust air channel 16c, and so on. Fresh air channels 18a, 18b, 18c . . . are interdigitated with exhaust air channels 16a, 16b, 16c . . . Preferably, both the exhaust and fresh air channels are constructed of heat conductive material to facilitate the transfer of heat from, for example, the room air which flows through the exhaust air channels to the fresh air which flows through the fresh air channels. As an example, the interdigitated channels which constitute the exhaust and fresh air conduits may be formed of aluminum or other readily available heat-conductive material.

From FIGS. 3 and 5, it will be appreciated that polluted room air flows in the upward direction through channels 16a, 16b, 16c, . . . , and that fresh air flows in the downward direction through channels 18a, 18b, 18c, . . . . Thus, the room air and the fresh air flow in respective, isolated conduits in a counterflow relationship. This counterflow arrangement improves the heat exchange efficiency between the respective air flows. Thus, during the winter season when the room air is warmer than the outside air, the fresh air which flows through fresh air conduit 14 is heated by the room air which flows through exhaust air conduit 12. Conversely, during the summer months when air-conditioning apparatus is used to cool the room air relative to the outside air, the fresh air which flows through fresh air conduit 14 is cooled by the room air which flows through exhaust air conduit 12.

A jacket 20 surrounds the exhaust and fresh air conduits, as shown in FIGS. 2-5, this jacket being spaced from the interdigitated channels so as to form a surrounding conduit 22. Removal register 38 is positioned in the wall of jacket 20 so as to permit room air in the vicinity of the ceiling to pass therethrough into surrounding conduit 22.

The bottom portion 24 of exhaust air conduit 12 is in fluid communication with conduit 22. More particularly, and as shown in FIG. 3, channels 16a, 16b, 16c, . . . of exhaust air conduit 12 open, at the bottom of the exhaust air conduit, to surrounding conduit 22 so as to permit air to pass from conduit 22 to these channels, whereupon this air then flows upward through exhaust air conduit 12 to the top portion 26 thereof. It will be recognized that the bottom portion of fresh air conduit 14 is closed with respect to surrounding conduit 22 and, thus, there is no mixing of the air in conduit 22 with the air in conduit 14.

The top portion 26 of exhaust air conduit 12 is coupled to a hood 28 which, in turn, is connected by an exhaust duct 30 to an exhaust blower 34. As shown in FIG. 2, only channels 16 of exhaust air conduit 12 open into hood 28. Channels 18 of fresh air conduit 14 are effectively sealed, or isolated, from the hood, as also shown in FIG. 3.

Thus, room air is seen to enter removal register 38 to flow downward through conduit 22 and then to enter channels 16 of exhaust air conduit 12 at the bottom portion 24 thereof, whereupon the room air then flows upward through the exhaust air conduit into hood 28 to be discharged via exhaust duct 30 and exhaust blower 34. As shown in FIG. 4, exhaust duct 30 passes through an opening 32 in an exterior wall W of the house. The exhaust duct then is coupled to exhaust blower 34 which, when driven, discharges the polluted room air through an exhaust vent 36 exteriorly of the room.

As shown in FIGS. 2-4, a top portion 40 of fresh air conduit 14 opens to a fresh air chamber 42 which is formed by an interior housing 44. This interior housing is illustrated in FIG. 2 as being box-shaped and encompasses opening 32 in exterior wall W. Thus, fresh air chamber 42 is in fluid communication with opening 32 and also with top portion 40 of fresh air conduit 14. Air which passes from the exterior of the house through opening 32 into chamber 42 then enters channels 18 of fresh air conduit 14 to flow downwardly through these channels. This air is seen to flow in a counter-direction to the flow of room air through channels 16 of exhaust air conduit 12.

From FIGS. 2-4, it will be seen that an enclosure 56 surrounds the bottom portion 54 of fresh air conduit 14. This enclosure 56 serves to isolate, or seal, the channels, or longitudinal ducts, which constitute the fresh air conduit from surrounding conduit 22. Moreover, enclosure 56 is provided with a lower wall 58 which may be perforated to provide communication only between channels 16a, 16b, 16c, . . . and surrounding conduit 22. There is no communication, however, between conduit 22 and channels 18a, 18b, 18c, . . . of the fresh air conduit. Thus, room air may pass through the perforations of lower wall 58 from conduit 22 into the channels, or longitudinal ducts, which constitute exhaust air conduit 12, but this room air is not permitted to pass through enclosure 56 into the channels, or longitudinal ducts, which constitute the fresh air conduit.

The front wall of enclosure 56, as viewed in FIG. 2, opens to supply register 60 so as to permit fresh air to pass from the channels that constitute fresh air conduit 14 through enclosure 56 and supply register 60 into the kitchen. Advantageously, supply register 60 is located in the vicinity of the floor of the kitchen.

It can be seen from FIG. 4 that opening 32 in exterior wall W communicates between chamber 42 formed within interior housing 44 and a chamber 48 which is formed within an exterior housing 46. This exterior housing 46 is illustrated, in perspective, in FIG. 6. From FIGS. 4 and 6, it is appreciated that exhaust duct 30 and exhaust blower 34 are disposed within exterior housing 46. Also, an inlet blower 50 is positioned within housing 46, this blower being coupled to an inlet vent 52 which opens to the exterior of this housing. Blower 50 also is provided with a port 51 which discharges fresh air that has been received from vent 52 into chamber 48. The fresh air then passes from chamber 48 through opening 32 into top portion 40 of the longitudinal ducts which constitute fresh air conduit 14. Thereafter, this fresh air flows in the downward direction through the fresh air ducts to exit at bottom portion 54 thereof into enclosure 56 and then through supply register 60 to the kitchen.

In one embodiment of the present invention a single drive motor 62 is coupled to both exhaust blower 34 and inlet blower 50. For example, a common drive shaft may be coupled to both blowers such that both may be driven by the single, common motor 62. In an alternative embodiment, exhaust blower 34 and inlet blower 50 are driven by respective exhaust and inlet motors. In this alternative embodiment, one of these motors may be deenergized, preferably to turn off inlet blower 50. For example, if the room air is too hot, particularly in the vicinity of the ceiling, but the outside air is relatively cool, as in the late afternoon or early evening hours of the summer, inlet blower 50 may be deactivated while exhaust blower 34 operates to discharge the room air. With inlet blower 50 deactivated, counterflow movement of the room and fresh air is reduced and, therefore, fresh air is not drawn in and heated by ventilator 10. Rather, the discharged room air is replaced by fresh air which enters the kitchen by infiltration, i.e. the inherent leakage by which fresh air enters the house. If desired, a flapper valve, such as valve 66 (shown in broken lines in FIGS. 4 and 6) hinged to port 51, may be provided at the output of blower 50 to block fresh air from entering chamber 48 unless this blower actually is operating. As another example, if the outside air is relatively warm but the inside air is too cold, as in the mid- or late-morning hours of the winter, inlet blower 50 may be deactivated while exhaust blower 34 remains operating. This avoids the cooling off of the warm fresh air by the cold room air in ventilator 10. Here too, the discharged room air is replaced by infiltration. This selective operation and deactivation of the blower motors may be achieved by manual switches or, preferably, by temperature sensors and suitable control circuits, such as electronic difference amplifiers.

In operation, let it be assumed that both exhaust blower 34 and inlet blower 50 are operated. Polluted room air passes through removal register 38 in the vicinity of the ceiling of the kitchen. If desired, as shown in FIG. 3, a pair of removal registers 38a and 38b may be provided on opposite walls of jacket 20.

The polluted room air flows in the downward direction in conduit 22 and then passes into channels 16a, 16b, 16c, . . . of exhaust air conduit 12 to flow upward through the longitudinal ducts which constitute these channels. This polluted room air then exits from channels 16a, 16b, 16c, . . . into hood 28 and then is discharged via exhaust duct 30 and exhaust blower 34 through exhaust vent 36 to the exterior of the house.

Concurrently with this flow of polluted room air, the operation of inlet blower 50 serves to suck in fresh air from the outside through inlet vent 52, this fresh air being expelled by port 51 into chamber 48. This chamber acts as an inlet duct to couple the fresh air through opening 32 into the longitudinal ducts 18 which constitute fresh air conduit 14. The fresh air then flows in the downward direction through the channels of the fresh air conduit, exiting via the front wall of enclosure 56 through supply register 60 to the vicinity of the floor of the kitchen. Hence, the fresh air and the polluted room air flow in counterdirections to each other through the interdigitated sets of channels 16 and 18.

As viewed in FIG. 5, it is seen that a channel 18a, 18b, 18c, ... through which the fresh air flows is substantially surrounded by the flow of polluted room air. That is, channel 18a is adjacent channel 16a, the latter having polluted air flowing therethrough; and channel 18a also is surrounded on its three remaining sides by conduit 22 through which polluted room air also flows. Similarly, channel 18b is adjacent channels 16a and 16b through which polluted room air flows, and the remaining two sides of channel 18b are adjacent conduit 22. Since each channel through which fresh air flows is substantially surrounded by room air flow, the efficiency of the heat transfer between these channels is improved. Of course, the air flow through channels 16 is in the counterdirection to the air flow through channels 18; although the direction in which the air flows through conduit 22 is the same as the direction in which the fresh air flows. Although counterflow is not present between conduit 22 and the channels of fresh air conduit 14, some heat exchange is carried out nevertheless.

While the present invention has been particularly shown and described with reference to a preferred embodiment thereof, it will be readily appreciated by those of ordinary skill in the art that various changes and modifications in form and details may be made without departing from the spirit and scope of the invention. For example, in a simple embodiment, exhaust air conduit 12 may be formed merely as a substantially cylindrical inner conduit and fresh air conduit 14 may be provided as an annular conduit surrounding the exhaust air conduit. Also, the relationship between exhaust duct 30 and chamber 48 may be interchanged. That is, a duct, or hose, may be used to couple port 51 of inlet blower 50 to fresh air conduit 14 while a simple housing, such as exterior housing 46, containing a chamber such as chamber 48 may be used to provide fluid communication between exhaust air conduit 12 and exhaust blower 34. Although not shown, filters may be provided, if desired, in the fresh air channel to remove undesired particulate matter from the fresh air which is drawn into the ventilator and supplied to the kitchen.

It is intended that the appended claims be interpreted as including the foregoing as well as various other modifications.

What is claimed is:

1. Apparatus for removing room air from a room of a house and for supplying fresh air to said room, comprising first vertically disposed conduit means through which said room air flows to the exterior of said room, said first conduit means being formed of heat conductive material and including a first set of vertically disposed channels to conduct a flow of air; second vertically disposed conduit means through which said fresh air flows to said room, said second conduit means being formed of heat conductive material and including a second set of vertically disposed channels to conduct a flow of air; said first and second sets of channels being interdigitated and in counterflow heat exchange relationship with each other to enable the transfer of heat from one to the other of the respective air flows conducted in said first and second sets of channels; a jacket surrounding and spaced from said first and second interdigitated sets of channels, thereby forming a third vertically disposed conduit surrounding said first and second sets of channels in the space between said jacket and said interdigitated channels, said third conduit being in fluid communication with said first conduit means; exhaust means in fluid communication with said first conduit means to discharge said room air therefrom; inlet means in fluid communication with said second conduit means to supply said fresh air thereto; a removal register coupled to said third conduit and positioned in said room in the vicinity of the ceiling thereof, and through which said room air passes to flow through said third conduit and then through said first conduit means to said exhaust means; said first conduit means communicating with said third conduit means within said jacket in the vicinity of the floor of the room, remote from said removal register; and a supply register coupled to said second conduit means and positioned in said room in the vicinity of the floor thereof, and through which said fresh air passes into said room from said second conduit means and said inlet means whereby room air drawn into said jacket through said removal register near the ceiling of the room by said exhaust means flows first downwardly in said third conduit means in concurrent relation to fresh air in said second conduit means and thence upwardly to said exhaust means through said first conduit means countercurrent to fresh air in said second conduit means.

2. The apparatus of claim 1 wherein said exhaust means and said inlet means comprise exhaust and inlet blowers, respectively.

3. The apparatus of claim 2 further comprising a common drive motor coupled to both said exhaust and inlet blowers such that both blowers are driven by a common motor.

4. The apparatus of claim 2 further comprising respective drive motors coupled to respective ones of said blowers such that said exhaust blower may be selectively driven while said inlet blower is not.

5. The apparatus of claim 4, further including means for deenergizing said inlet blower when a predetermined temperature difference is present between said room air and said fresh air.

6. The apparatus of claim 5 wherein said predetermined temperature difference is constituted by said room air being substantially hotter than said fresh air during hot weather seasons.

7. The apparatus of claim 5 wherein said predetermined temperature difference is constituted by said room air being substantially colder than said fresh air during cold weather seasons.

8. The apparatus of claim 2 further comprising an exhaust vent in fluid communication with said exhaust blower and an inlet vent in fluid communication with said inlet blower, said exhaust and inlet vents opening to the exterior of said house.

9. The apparatus of claim 8 wherein said exhaust and inlet blowers are located at the exterior of said house.

10. The apparatus of claim 9, including exhaust duct means for coupling said first conduit means to said exhaust blower and inlet duct means for coupling said inlet blower to said second conduit means.

11. The apparatus of claim 1 wherein said interdigitated sets of channels are arranged such that a channel through which fresh air flows is substantially surrounded by room air flows.

12. The apparatus of claim 11 wherein a channel in said second set is adjacent at least one channel in said first set and the remainder thereof is substantially surrounded by said third conduit.

13. The apparatus of claim 1 wherein each of said first and second conduit means is formed of longitudinal ducts to define substantially linear air flow therein.

14. The apparatus of claim 13 wherein said third conduit is fluid coupled to said first conduit means at an end of the latter that is remote from said exhaust means, such that said room air flows in said third conduit in a direction opposite to that in said first conduit means.

15. The apparatus of claim 14 wherein said fresh air is heated as it flows through said second conduit means by the room air flowing through said first conduit means and said third conduit.

16. A regenerative room ventilator for use in a house to replace room air with fresh air, comprising:
- a first substantially longitudinal, vertical conduit through which room air flows to be exhausted to the exterior of said house;
- a second substantially longitudinal, vertical conduit through which fresh air flows from the exterior of said house to be supplied to said room, said first and second conduits being in heat exchange relationship with each other to transfer heat from the air flowing in one to the air flowing in the other, the respective air flows being in counterflow relationship to each other;
- a longitudinal vertical jacket surrounding and spaced from said first and second conduits to form a third vertical conduit in the space between said jacket and said first and second conduits surrounding said first and second conduits, said third conduit being fluid coupled to said first conduit at one end of the latter in the vicinity of the floor of said room;
- an exhaust blower located exteriorly of said house and fluid coupled to said first conduit at an end opposite to and remote from said fluid coupling of the first conduit to said third conduit, said exhaust blower being operable to discharge room air from said first conduit to the exterior of said house;
- an inlet blower located exteriorly of said house and fluid coupled to said second conduit in the vicinity of the ceiling of said room to supply fresh air from the exterior of said house to said second conduit;
- a common motor located exteriorly of said house coupled to both said exhaust and inlet blowers for driving both said blowers;
- removal register means coupled to said third conduit and located in the vicinity of the ceiling of said room, and through which said room air passes to flow downwardly through said third conduit around said first and second conduits to said first conduit and then upwardly through said first conduit countercurrent to fresh air in said second conduit to said exhaust blower; and
- supply register means coupled to said second conduit and located in the vicinity of the floor of said room, and through which said fresh air passes to said room from said second conduit and said inlet blower.

* * * * *